(12) United States Patent
Houg

(10) Patent No.: US 6,243,770 B1
(45) Date of Patent: Jun. 5, 2001

(54) METHOD FOR DETERMINING STATUS OF MULTIPLE INTERLOCKING FIFO BUFFER STRUCTURES BASED ON THE POSITION OF AT LEAST ONE POINTER OF EACH OF THE MULTIPLE FIFO BUFFERS

(75) Inventor: Todd C Houg, St. Francis, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/119,663

(22) Filed: Jul. 21, 1998

(51) Int. Cl.$^7$ ..................................................... G06F 13/14
(52) U.S. Cl. .................. 710/57; 710/52; 710/53
(58) Field of Search .................... 710/52, 53, 58, 710/56, 57, 61; 709/234; 711/100, 118, 140; 365/189.05, 230.08

(56) References Cited

U.S. PATENT DOCUMENTS

| | | | |
|---|---|---|---|
| 4,677,616 | * 6/1987 | Franklin | 370/94 |
| 4,785,415 | * 11/1988 | Karlquist | 364/900 |
| 4,814,762 | * 3/1989 | Franaszek | 340/825.79 |
| 5,163,157 | * 11/1992 | Yamano et al. | 712/218 |
| 5,371,849 | * 12/1994 | Peaslee et al. | 395/162 |
| 5,404,480 | * 4/1995 | Suzuki | 395/425 |
| 5,444,658 | * 8/1995 | Izawa et al. | 365/189.07 |
| 5,680,564 | * 10/1997 | Divivier et al. | 712/205 |

FOREIGN PATENT DOCUMENTS

08191312 * 7/1996 (JP) .

* cited by examiner

Primary Examiner—Thomas Lee
Assistant Examiner—Thuan Du
(74) Attorney, Agent, or Firm—Dorsey & Whitney LLP

(57) ABSTRACT

One embodiment of the present invention relates to a method for using at least two first-in, first-out ("FIFO") buffers in a pipelined bus, comprising, interlocking the at least two FIFO buffers, wherein the act of interlocking comprises defining a transaction correspondence between the phases tracked by each of the buffers.

8 Claims, 4 Drawing Sheets

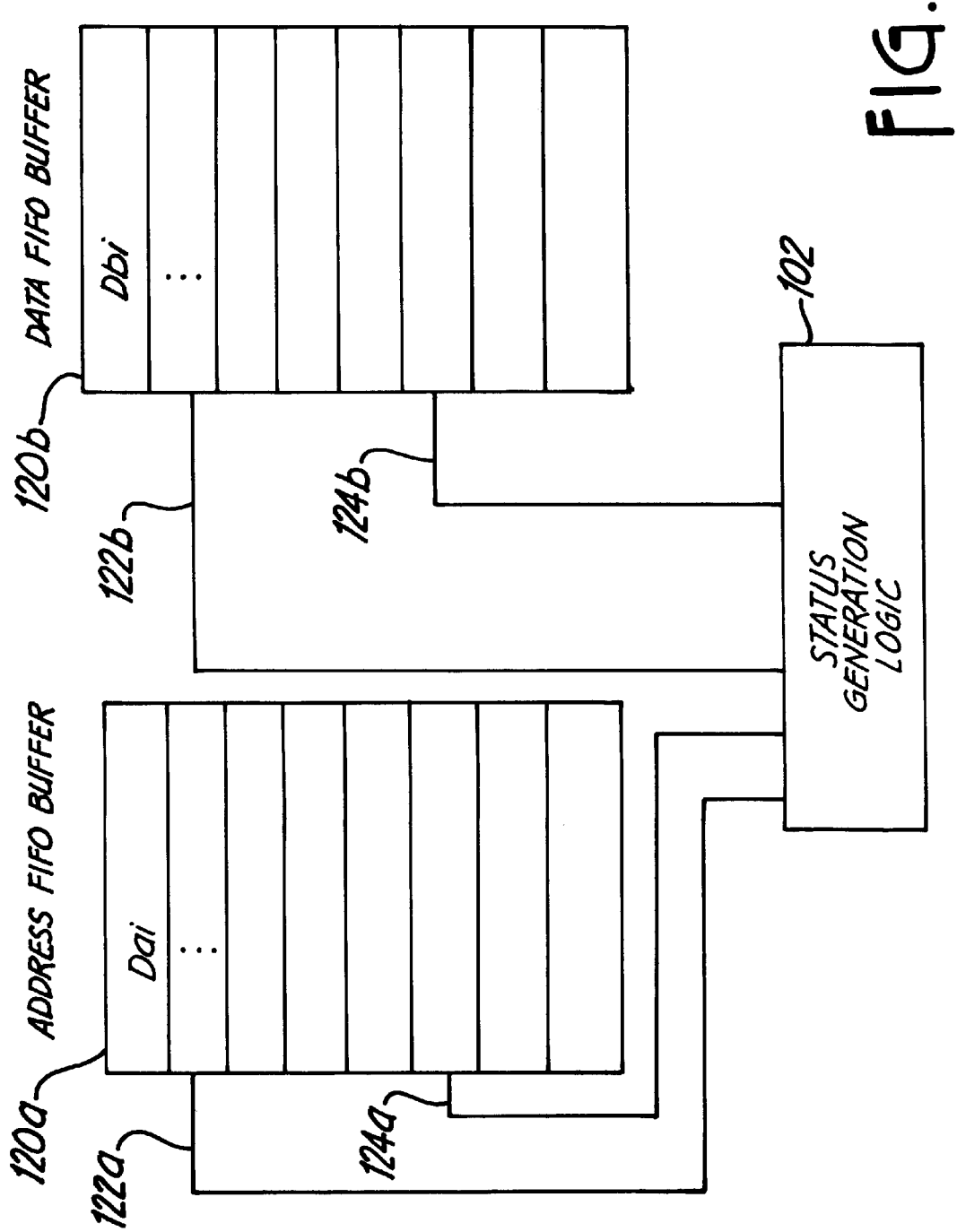

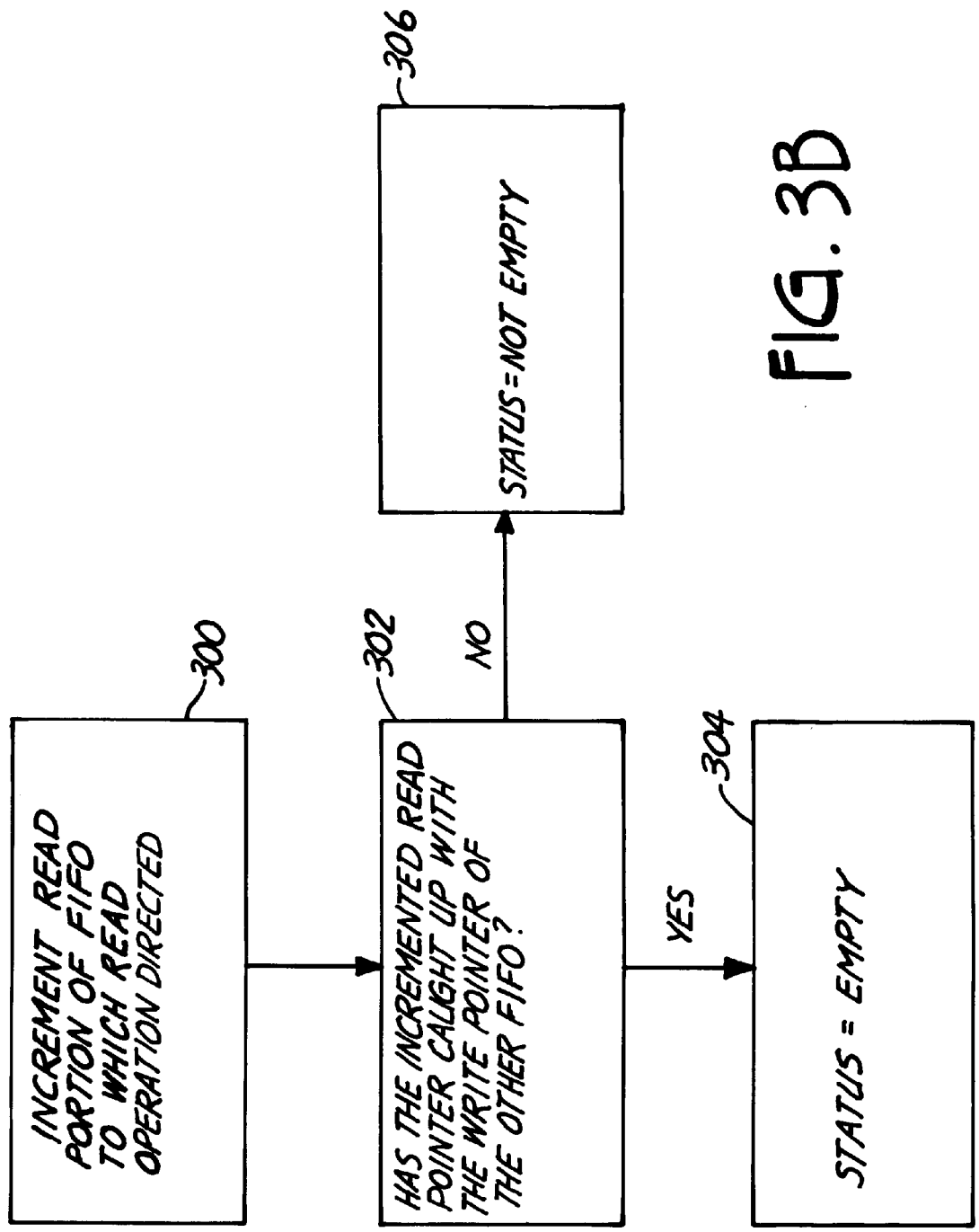

METHOD FOR DETERMINING STATUS OF MULTIPLE INTERLOCKING FIFO BUFFER STRUCTURES BASED ON THE POSITION OF AT LEAST ONE POINTER OF EACH OF THE MULTIPLE FIFO BUFFERS

TECHNICAL FIELD

The present invention relates to communications within a computer. In particular, the present invention relates to the use of multiple interlocking first-in, first-out ("FIFO") buffers.

BACKGROUND

Using a PCI bus, data transfers can be accomplished using burst transfers. There are two participates in every PCI burst transfer: the initiator and the target. The initiator is the device that initiates the transfer. The target is the device currently addressed by the initiator for the purpose of performing a data transfer. All PCI bus transactions consist of an address phase followed by one or more data phases. During the address phase, the initiator identifies the target device and the type of transaction. The data phase of a transaction is a period during which a data object is transferred between the initiator and the target. The number of data bytes to be transferred during a data phase is determined by the number of Command/Byte Enable signals that are asserted by the initiator during the data phase. Also, the number of data phases depends on how many data transfers are to take place during the overall burst transfer. Each data phase has a minimum duration of one PCI CLK. Each wait state inserted in a data phase extends it by an additional PCI CLK. The duration of a transaction is from the start of the address phase to the completion of the final data phase.

A non-pipelined bus architecture allows only a single transaction at a time, generally consisting of a request (address) phase and a response (data) phase with each response phase completing before the next address phase. A pipelined bus architecture allows multiple outstanding transaction requests (address phases) to be made prior to the completion of subsequent phases. Only one address phase may be active at one time, but there may be multiple address phases that have occurred prior to the corresponding data phases.

Currently, separate FIFO buffers are used in the implementation of a pipelined bus architecture. For instance, an implementation of a pipelined bus architecture may involve having one FIFO buffer for the address phase and one FIFO buffer for the data phase. Three of the problems faced in implementing a pipelined bus architecture having separate FIFO buffers are data overflow, data underflow, and inefficient use of memory. When implementing a pipelined bus architecture with FIFO buffers, multiple addresses may have to be written into the address FIFO buffer prior to having the corresponding data available for writing into the data FIFO buffer. However, in order to prevent data overflow that causes data to be overwritten, there must be space available in the data FIFO buffer prior to accepting an additional address into the address FIFO buffer.

Similarly, for a read operation, multiple addresses may be read from an address FIFO buffer prior to reading the corresponding data from the data FIFO buffer. In order to prevent data underflow (i.e., not having the data available for the addresses that have been read), the data corresponding to the addresses read from the address FIFO buffer must have been written into the data FIFO buffer prior to the addresses being read from the address FIFO buffer. Clearly, a FIFO buffer structure for use in a pipelined bus architecture that will prevent data underflow and data overflow would be desirable.

In implementing a pipelined bus interface, a logic state machine may be used. The logic state machine is responsible for tracking each transaction through its corresponding phase. A problem with using a logic state machine in this manner is that the machine needs to know not only the position of the read and write pointers of its corresponding FIFO buffer, but the position of the read and write pointers of other interrelated FIFO buffers in order to make decisions about the current phase. However, the logic state machine cannot determine the position or location of the pointers within the other interrelated FIFO buffers.

Implementing a pipelined bus to bus interface using separate FIFO buffers may increase storage requirements. Each phase may require access to the same data structure. For instance, such is the case when a snoop phase requires the address to present to the snooping agent and a request phase also requires the same address to present to the request agent. Using separate FIFO buffers for each phase requires storing the same information in two separate data structures. This multiple storage of the same information is an inefficient use of memory. Clearly, a FIFO buffer structure for use in a pipelined bus architecture that reduces storage requirements would be desirable.

SUMMARY

One embodiment of the present invention relates to a method for using at least two first-in, first-out ("FIFO") buffers in a pipelined bus, comprising, interlocking the at least two FIFO buffers, wherein the act of interlocking comprises defining a transaction correspondence between the phases tracked by each of the buffers.

Another embodiment of the present invention relates to a method for identifying a status of a buffer structure having at least two first-in first-out ("FIFO") buffers that are interlocked, with each FIFO buffer having a read pointer and a write pointer. The method comprises receiving a logic signal (i.e., a strobe) requesting the performance of an operation on the buffer structure and determining the status of the buffer structure based on the position of at least one pointer of each of the at least two FIFO buffers.

BRIEF DESCRIPTION OF THE DRAWINGS

FIG. 2 shows an embodiment of the present invention having two interlocked FEO buffers.

FIGS. 3A and 3B are decision trees for the logic generating status of the buffer for implementing the present invention.

DETAILED DESCRIPTION

Figure 1:
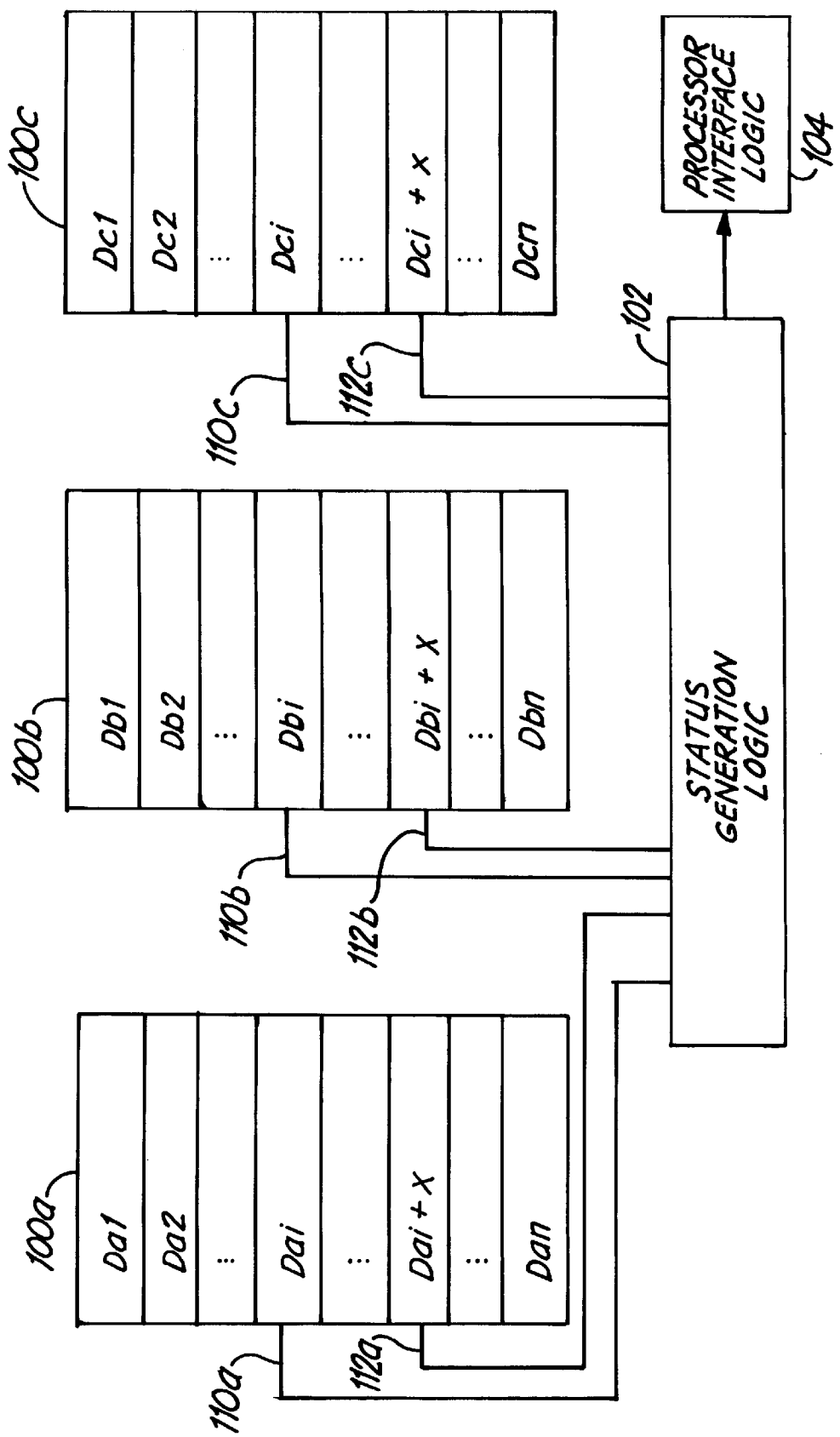
FIG. 1 shows multiple, interlocked first-in, first-out ("FIFO") buffers connected to processor interface logic

FIG. 1 is a block diagram of one embodiment of the present invention showing an implementation of multiple, interlocked FIFO buffers for use in a pipelined bus architecture. A pipelined bus architecture may have multiple phases. For instance, two common phases are a request phase or address phase and a response phase or data phase. The present invention allows for pipelining of multiple phases by referencing a common data structure, while preventing the overflow or underflow between the address and data portions of the interlocked FIFO buffers 100. The Pentium Pro and Pentium II bus have a pipelined bus architecture that represents one example of a bus architecture to which the embodiments disclosed herein are applicable.

Interlocked FIFO Buffers

FIG. 1 shows a plurality of FIFO buffers 100a, 100b, 100c operatively linked to status generation logic 102. FIFO buffer 100a comprises a plurality of data structures Da1, Da2, . . . Dai, . . . Dan, a read pointer 110a, and a write pointer 112a. Each pointer 110a, 112a wraps around from the last data structure Dan to the first data structure as the pointers advance. In general, the read pointer 110a points to the next data structure Dai that has valid information to be read, and the write pointer 112a points to the next available data structure Daj into which information may be written. As information is written to the FIFO buffer 100a, the write pointer 112a advances until it may catch up with the read pointer 110a, at which time the FIFO buffer 100a is full. Similarly, as information is read from the FIFO buffer 100a, the read pointer 110a advances until it may catch up with the write pointer 112a, at which time the FIFO buffer 100a is empty.

The other FIFO buffers 100b, 100c are structured in the same way as buffer 100a. A buffer structure comprises at least two FIFO buffers. Each of the buffers is interlocked with the others when there exists a transaction correspondence between the phases tracked by each of the buffers. That is, the information in Da1 corresponds to transaction-related information in Db1 and Dc1. For example, Da1 may contain address phase information for a transaction and Da2 will contain data phase information for the same transaction. Thus, in one embodiment, the transaction correspondence is that a numbered data structure in one FIFO (e.g., Da1) will have or has information that is transactionally-related to information that is contained or will be contained in the same numbered data structure (e.g., Db1) in another of the interlocked FIFO buffers. However, depending on the relationship required between the buffers for a transaction, the transaction correspondence between the phases tracked by each of the buffers may be embodied differently. Continuing to refer to FIG. 1, status generation logic 102 provides a status of the interlocked FIFO buffers 100a, 100b, 100c (i.e., whether the interlocked buffers are full or empty) based on the location of the pointers of the interlocked FIFO buffers. This status provided by the status generation logic 102 is communicated to a processor (not shown) via the processor interface logic 104.

As noted, for FIFO buffers 100a, 100b, 100c to be interlocked, there must be a relationship between the information in corresponding data structures in the buffers 100. With reference to FIG. 2, a buffer structure having two interlocking FIFO buffers 120a, 120b will be described. This buffer structure may be used with a pipelined bus architecture. Each FIFO buffer 120a, 120b may correspond to a transaction phase of a pipelined bus. For instance, as shown in FIG. 2, one FIFO buffer 120a may correspond to an address phase ("address FIFO buffer") and the other FIFO buffer 120b may correspond to a data phase ("data FIFO buffer"). The address FIFO buffer 120a has an address read pointer 122a and an address write pointer 124a. Similarly, the data FIFO buffer 120b has a data read pointer 122b and a data write pointer 124b. The address FIFO buffer 120a and the data FIFO buffer 120b may be interlocked, because the data corresponding to each address in each data structure Dai of the address FIFO buffer 120a is (or when supplied, will be) contained in the corresponding data structure Dbi of data FIFO buffer 120b. Although the present invention may be implemented in a pipelined bus architecture having two interlocked FIFO buffers 100, a more complex implementation may have as many interlocked FIFO buffers as are required by the bus protocol that is supported.

One advantage of having interlocking FIFO buffers is that this arrangement allows sharing of a common data structure by each phase in the pipelined bus architecture, thereby reducing storage requirements when compared to implementations using separate FIFO buffers 100. For instance, an implementation may require the address or data to be available at different phases. Thus, a single copy may be stored but read via multiple read pointers.

Status Generation Logic

As shown in FIG. 1, status generation logic 102 may be operably linked to the read and write pointers 110a, 110b, 110c, 112a, 112b, 112c of each interlocked FIFO buffer 100a, 100b, 100c. The status generation logic 102 determines the status of the interlocked FIFO buffers in a buffer structure based on the location or position of the read and write pointers of each of the FIFO buffers that form the buffer structure. In one embodiment, the status generation logic determines the status of the buffer structure based on the position or location of at least one pointer in each of the buffers that comprise the interlocked buffer structure. Also, the status generation logic may also control the read and write pointers. That is, the status generation logic may also increment the read and write pointers as needed. In one embodiment, the status generation logic may be implemented in an Application Specific Integrated Circuit ("ASIC").

Providing The Status Of The Buffer Structure

Figure 3A:
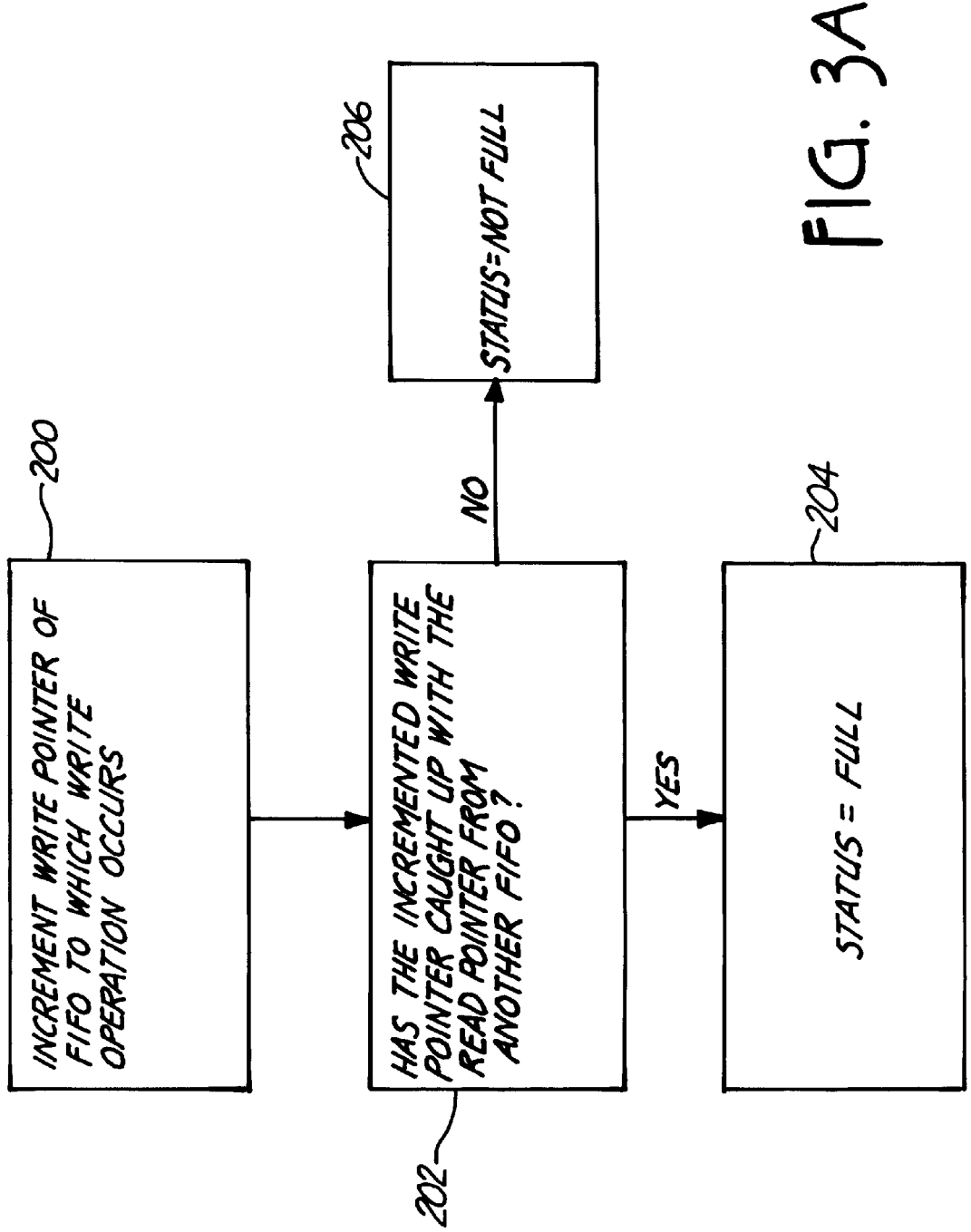

With reference to FIGS. 3A and 3B, the status generation logic 102 will be described. In particular, FIGS. 3A and 3B are flow charts for the implementation of two interlocked FIFO buffers 120a, 120b shown in FIG. 2 (i.e., the address FIFO buffer 120a and the data FIFO buffer 120b). FIG. 3A is a flow chart for a write operation and FIG. 3B is a flow chart for a read operation.

Write Operation

At block 200, upon receiving a strobe or logic signal for a write operation to the address FIFO buffer 120a, the address write pointer 124a is incremented. At block 202, it is determined whether the incremented address write pointer 124a has caught up with the data read pointer 122b for the other interlocked FIFO buffer. That is, in the case of the interlocked data and address FIFO buffers 120b, 120a where a strobe to write an address in the address FIFO buffer 120a has been made, a full status (block 204) would be indicated when the address write pointer 124a catches up with the data read pointer 122b. When the address write pointer 124a catches up with the data read pointer 122b, the data read pointer 122b is pointing to a data structure Dbi that needs to be read. Consequently, the data structure Dbi in the data FIFO buffer 120b that corresponds to the data structure Dai in the address FIFO buffer 120a does not have room for the data corresponding to the next address to be written in the address FIFO buffer 120a. However, if the incremented address write pointer 124a has not caught up with the data read pointer 122b, then, as shown in block 206, a not full status is indicated.

In short, if a data structure Dbi is available in the data FIFO structure 120b, then subsequent writes to the address FIFO buffer 120a are allowed by indicating a not full status (block 206). However, if a data structure Dbi is not available in the data FIFO buffer 120b for the data corresponding to the address to be written by a subsequent write to the address FIFO buffer 120a, then a full status is provided for the address FIFO buffer 120a, even though the data structures Dai in address FIFO buffer 120a itself are not full. This status report prevents data overflow.

Read Operation

Similarly, as shown in FIG. 3B, if a read strobe is received for the address FIFO buffer 120a, then at block 300, the address read pointer 122a is incremented. Then, to determine the status of the buffer structure for purposes of the read operation, the status generation logic 102 determines whether the incremented read pointer caught up with the data write pointer 124b. If the address read pointer 122a has caught up with the data write pointer 124b, then, as shown at block 304, an empty status would be returned. The empty status is indicated because the next read address is available but the corresponding data is not yet available. However, if the address read pointer 122a has not caught up with the data write pointer 124b, then, as shown in block 306, a not empty status would be returned.

In short, if the corresponding data is there in the data structure Dbi of the data FIFO buffer 120b, the status of not empty is provided and the next address in the address FIFO buffer 120a is available to be read. However, if the corresponding data is not written in the data FIFO buffer 120b, then the status is indicated as empty even though the address FIFO buffer 120a is not empty. This status report prevents data underflow.

Sample VHDL pseudo code is listed below for the implementation shown in FIG. 2.

```
Data writes:
if (DATA_WR_PTR_ce = '1') then              — Look for a data write strobe.
    DATA_WR_PTR <= NEXT_DATA_WR_PTR;        — Increment the data write pointer
    if (DATA_WR_PTR /= ADDR_RD_PTR) then    — If the data write pointer does not catch
        FIFO_EMPTY <= '0';                  —     the NEXT address read pointer,
    end if;                                 —     mark the FIFO as not empty
end if;
— Data reads:
if (DATA_RD_PTR_ce = '1') then              — Look for a data read strobe.
    DATA_RD_PTR <= NEXT_DATA_RD_PTR;        — Increment the data read pointer.
    if (DATA_RD_PTR /= ADDR_WR_PTR) then    — If the data read pointer does not catch
        FIFO_FULL <= '1';                   —     the NEXT data read pointer,
    end if;                                 —     mark the FIFO as full
end if;
— Address reads:
if (ADDR_RD_PTR_ce = '1') then              — Look for a data read strobe
    ADDR_RD_PTR <= NEXT_ADDR_RD_PTR;        — Increment the address read pointer
    if (ADDR_RD_PTR = DATA_WR_PTR) then     — If the address read pointer catches
        FIFO_EMPTY <= '1';                  —     the NEXT data write pointer,
    end if;                                 —     Mark the FIFO as empty
```

The algorithm disclosed by this code is implemented in the status generation logic.

While a preferred embodiment of the present invention has been described, it should be appreciated that various modifications may be made by those skilled in the art without departing from the spirit and scope of the present invention. Accordingly, reference should be made to the claims to determine the scope of the present invention.

What is claimed is:

1. A method for identifying a status of a buffer structure having at least two interconnected first-in first-out ("FIFO") buffers, with each FIFO buffer having a read pointer and a write pointer, comprising:

(a) receiving a logic signal requesting the performance of an operation on the buffer structure;

(b) determining the status of the buffer structure based on the position of at least one pointer of each of the at least two FIFO buffers.

2. The method of claim 1, wherein the act of receiving a logic signal requesting the performance of an operation on the buffer structure comprises receiving a logic signal for a read operation for reading from a first FIFO buffer.

3. The method of claim 2, further comprising incrementing the read pointer of the first FIFO buffer.

4. The method of claim 3, wherein the act of determining the status of the first FIFO buffer comprises comparing the incremented read pointer of the first FIFO buffer to a write pointer the second FIFO buffer, wherein if the incremented read pointer catches up with the write pointer of the second FIFO, then the buffer structure is empty.

5. A method for determining a status of a buffer structure have a first first-in, first-out ("FIFO") buffer and a second FIFO that are interconnected, with each FIFO buffer having a read pointer and a write pointer, comprising:

(a) receiving a logic signal requesting the performance of an operation on the buffer structure;

(b) determining the status of the buffer structure based on the position of at least one pointer of each of the two FIFO buffers.

6. The method of claim 5, wherein the act of receiving a logic signal requesting the performance of an operation on the buffer structure comprises receiving a logic signal for a write operation for writing to the first FIFO buffer.

7. The method of claim 6, further comprising incrementing the write pointer of the first FIFO buffer.

8. The method of claim 7, wherein the act of determining the status of the first FIFO buffer comprises comparing the position of the incremented write pointer of the first FIFO buffer to the position of the read pointer of the second FIFO buffer, wherein if the incremented write pointer has caught up with the read pointer of the second FIFO buffer, then the buffer structure is full.

* * * * *